March 22, 1966  M. E. LAYNE  3,242,340
PHOTOSENSITIVE MEANS FOR CONTROLLING LEVELING AND GRADING
APPARATUS AND ESTABLISHING REFERENCE LEVELS
Filed Feb. 12, 1963  2 Sheets-Sheet 1
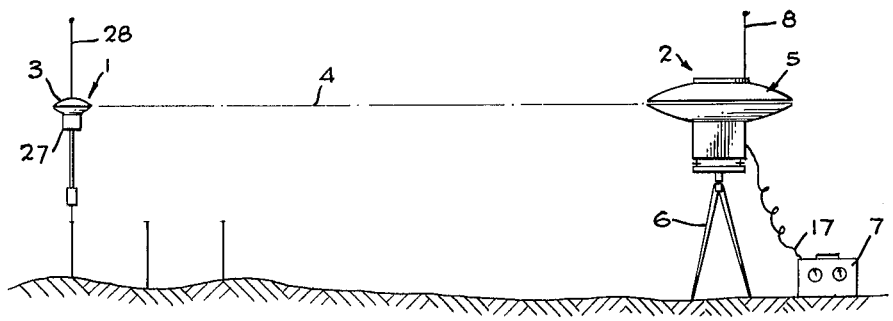
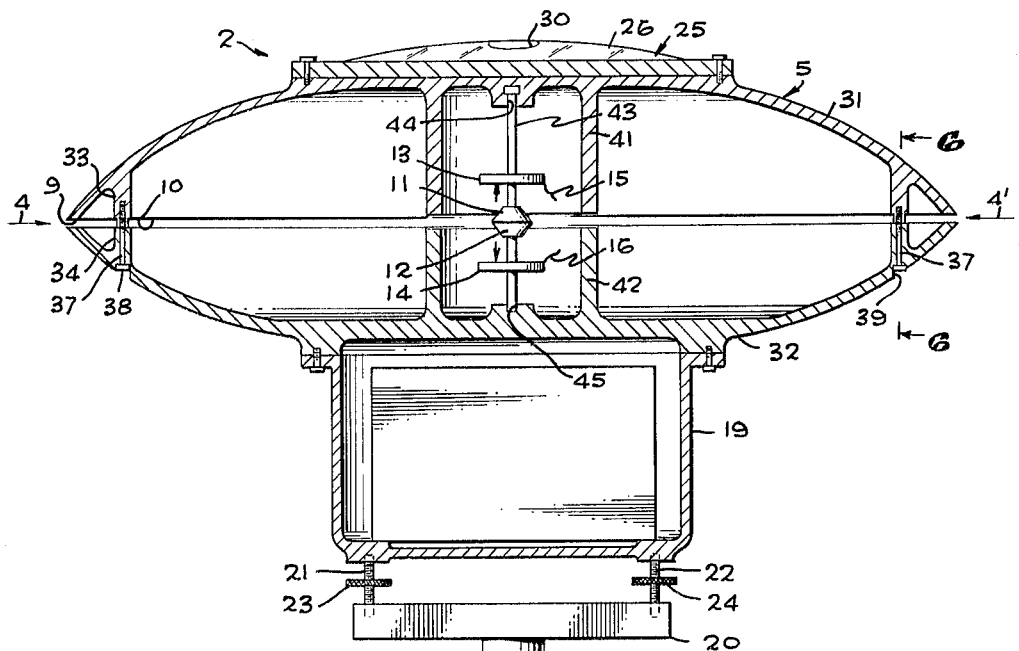
MELVIN E. LAYNE
INVENTOR.
BY
Le Roy J. Leishman
AGENT March 22, 1966  M. E. LAYNE  3,242,340
PHOTOSENSITIVE MEANS FOR CONTROLLING LEVELING AND GRADING
APPARATUS AND ESTABLISHING REFERENCE LEVELS
Filed Feb. 12, 1963  2 Sheets-Sheet 2
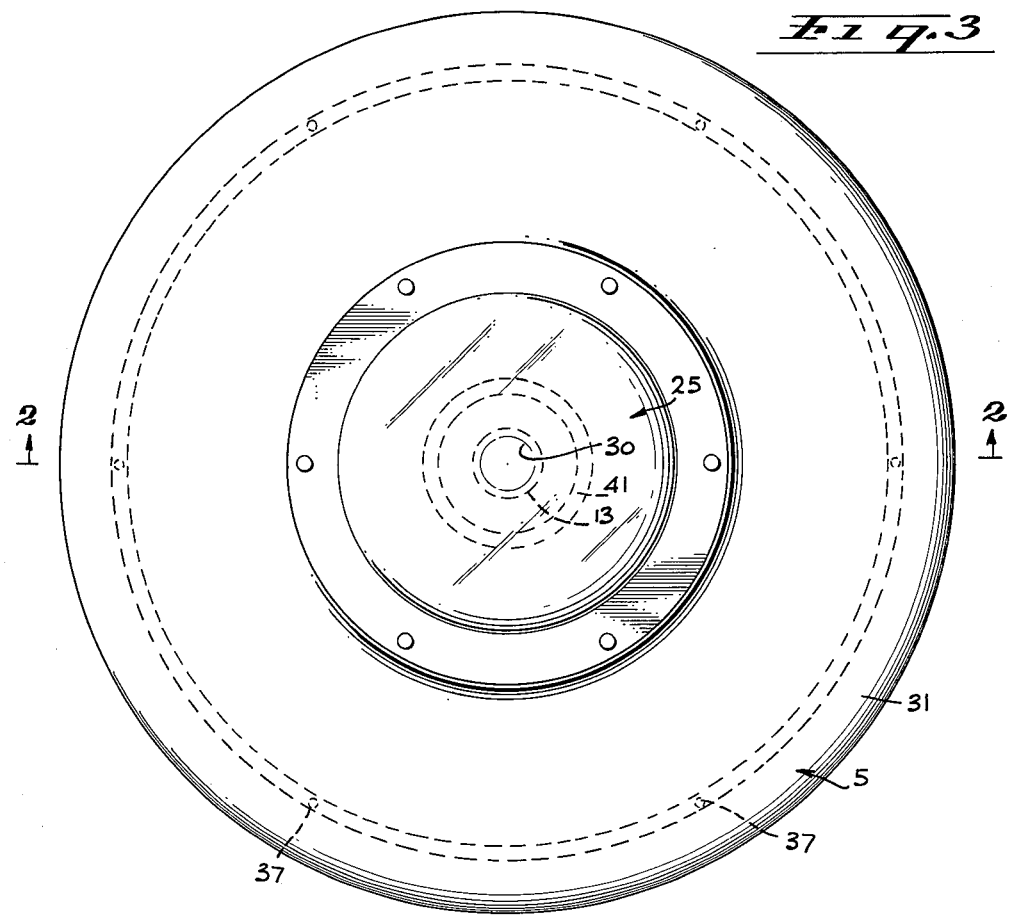
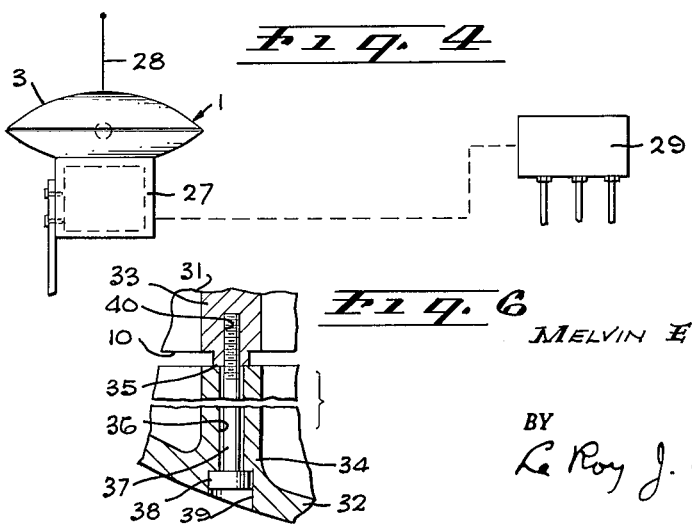
MELVIN E. LAYNE
INVENTOR.
BY
La Roy J. Leishman
AGENT United States Patent Office 3,242,340
Patented Mar. 22, 1966

3,242,340
PHOTOSENSITIVE MEANS FOR CONTROLLING LEVELING AND GRADING APPARATUS AND ESTABLISHING REFERENCE LEVELS
Melvin E. Layne, 7063 Vanalden, Reseda, Calif.
Filed Feb. 12, 1963, Ser. No. 257,906
13 Claims. (Cl. 250—208)

The invention herein described pertains to leveling equipment for use in grading, concrete paving, road work, lot leveling, field surveys and for such diversified other purposes as governing the depth of post or pole holes for fences or power lines, and it more particularly pertains to apparatus of this type utilizing light rays or other electro-magnetic waves in association with equipment whereby the grading or leveling, etc., is done automatically.

One object of the present invention is to provide a level-, or plane-, establishing device that will sense the relative level of a remote mobile operating unit with respect to the plane established by the device and to provide means in conjunction with the level-establishing device to relay information to the mobile unit, or to the personnel controlling the same, as to the relative position of the two planes or levels.

Another object is to provide equipment of the type described in which the operating equipment will embody a source of light or other electro-magnetic waves whose elevation may be varied.

An additional object is to provide means at the control station for transmitting information by radio waves that may be received at the operating or mobile station as to the altitude or level of the radiating source at the operating unit with respect to the sensing device at the control unit.

Another object is to equip the operating unit with suitable radio receiving equipment in association with apparatus that will make the signals at the control unit meaningful to the operating personnel of the operating unit, and in various embodiments of the invention to effect the automatic raising or lowering of leveling, grading or other equipment.

Still another object is to provide the level-determining unit with wave-guiding means appropriate to the type of radiation being used whereby two different radio sensing instruments will receive varying amounts of radiation depending upon the altitude of the remote light source with respect to the plane-determining apparatus.

A further object is to provide the level-determining device with means whereby the device itself may be leveled.

Yet another object in conjunction with the level-determining equipment is to provide means carried thereby whereby it may readily be determined when the device itself is level.

Still other objects will appear as the specification proceeds.

Referring to the drawings:

FIGURE 1 is a diagrammatic illustration of a mobile operating unit and a plane- or level-determining unit indicating the reception at the latter unit of radiation from the operating unit;

FIG. 2 is a vertical section through the plane-determining unit showing the wave guiding means and the reflecting devices whereby the incoming waves are directed to one or other of two light sensing instruments in accordance with the relative intensity of the waves falling upon the first mentioned means.

FIG. 3 is a top view of the device of FIG. 2;

FIG. 4 is a diagram showing automatic hydraulically operated hole-digging equipment under the control of the operating station that embodies the source of radiations.

FIG. 5, on the first page of the drawings, illustrates a modification of a part of the device of FIG. 2 in which prisms are substituted for the first-surface reflecting means employed in the FIG. 2 arrangement.

FIG. 6 is a fragmentary section taken on line 6—6 of FIG. 2.

My invention may perhaps be most readily understood by referring first to FIG. 1 which shows, diagrammatically, a mobile station 1 and a stationary or level-determining unit 2. The mobile unit embodies a radiation source 3. The radiations may be light rays or other electro-magnetic wave preferably of an ultra-high frequency so that they may be accepted or rejected by means of wave guides. The radiations 4 are indicated by a broken line shown intersecting the level-, or plane-, determining unit 5 of the stationary unit 2.

In FIG. 1 the stationary unit comprises a tripod 6 and a radio transmitter 7 which operates in conjunction with the transmitting antennae 8.

The operation of the reference, or plane-determining, station 5 will perhaps be best understood by referring to FIG. 2 where the previously mentioned light ray 4 is shown entering the structure 5 through a first aperture 9 and a second aperture 10. A similar light ray 4' is shown on the opposite side of the structure 5, although it will be understood that any radiation originating at the source 3 will at any given time enter the unit 5 from one side only. However, the mobile source 1, comprising the radiating apparatus 3, may be located on any side of the reference station 5, and the ray 4' indicates the ray that would be emitted were the radiating apparatus located at the right of unit 5 instead of at the left.

The function of the two apertures 9 and 10 in the illustrated embodiment here being described is to define a level path for the ray in order to reject waves that are not traveling in a level plane. It will be readily understood, however, that a unitary channel could be provided instead of the two aligned apertures 9 and 10; in fact, any appropriate means for determining a definite path that the entering rays must travel will hereinafter be referred to as a channel irrespective of whether the channel is continuous or broken into two or more apertures or passages, as illustrated in FIG. 2.

The general construction of the unit 5 will be described after its purpose has been set forth in conjunction with the light rays 4. Any rays passing through the channel 9–10 will impinge upon one or other of the radiation reflecting members 11 or 12, or upon both of them. In the embodiment illustrated in FIG. 2, members 11 and 12 are shaped like frustums of two cones disposed with their bases together. The outer surfaces are polished and are disposed at an angle of approximately 45° with respect to the bases.

The rays that would fall upon reflector 11 are of course directed upwardly, as indicated by the arrow, so that they will reach the radiation sensing instrument 13, and the rays incident to reflector 12 are similarly directed downwardly, as indicated by the opposite arrow, where they strike the radiation sensing instrument 14. If the waves 4 are light rays, members 13 and 14 may be photocells or other units which vary an electric current passing therethrough in accordance with the intensity of the light falling upon them. The cord 15 embodies the conductors connected to the radiation sensing unit 13, and cord 16 similarly embodies the conductors for the radiation detecting unit 14. The conductors contained in the cords 15 and 16 proceed through cord 17, FIG. 1, to the unit 7 which contains suitable amplifiers for the output from the radiation sensing units 13 and 14 as well as suitable electronic equipment that enables the radio transmitter in unit 7 to send out signals from the antennae 8 which vary in accordance with the relative intensity of the currents passing through, or originating in, the radiation sensitive instruments 13 and 14.

The amount of rays from a given source reflected from members 11 and 12 will of course be equal only when such rays are passing through channel 9–10 in a substantially straight line, or, in other words, when the apertures 9 and 10 are both in alignment with the radiation source. When this condition prevails, if unit 3 is the principal source, it will of course mean that the radiating device 3 is on the same level as the apertures 9 and 10. However, since the function of unit 5 is to establish a definite reference level or plane, the channel 9–10 and the corresponding structure on the opposite side of the unit 5 must be aligned in a level plane, and the equipment shown in FIG. 2 must therefore embody not only suitable means for leveling the structure, but also for indicating when such leveling has been achieved. I, accordingly, mount the lower portion 19 of the unit 5 upon the upper plate 20 of the tripod 6 by means of three combination right and left hand screws, such as screws 21 and 22, which have enlarged portions 23 and 24, respectively, whereby they may be rotated, rotation in one direction serving to raise the immediately super-posed part of portion 19 of unit 5, and rotation in the opposite direction causing it to be lowered. The construction of these leveling means will not be further described, as they form no part per se of the present invention.

Cooperating with these leveling means is a bubble vial 25 mounted on the top of unit 5. This bubble vial has a convex transparent cover 26 which, of course, must be sealed to the lower portions of the vial, and the vial must be filled with a fluid excepting for a sufficient amount of gas, usually air, to form a bubble 30 which indicates by its presence at the center of the vial that the device is level, and the direction of displacement of the bubble from the center of the vial indicates the nature of the adjustment of the leveling screws that is required to level the device.

When the structure 5 has been leveled in the manner described, it will of course be obvious that the current from the radiation sensing elements 13 and 14 will be equal only when the radiation source 3 is in a level plane with the level determining unit 5. If the radiation source 3 should be slightly above this plane, it should be clear that the channel 9–10, although very narrow with respect to its length, will nevertheless pass some of its rays, but that they will proceed at a slightly downward angle with the result that a greater amount of radiation will be received on member 12 than on member 11, and as a consequence a greater current will flow through the conductors in cord 16 than in the conductors in cord 15. The signal transmitted from the antenna 8 will indicate this.

The main portion of the structure 5, as shown in FIG. 2, comprises two complementary shells 31 and 32, disposed with their open sides facing each other but spaced apart sufficiently to provide a narrow peripheral opening between them. This opening 9 constitutes the entrance to the channel previously referred to through which incoming rays may pass. Reference has also been made to the opening or aperture 10. In the embodiment illustrated, this is a space between the opposed edges of the web 33 depending from the upper shell 31 and the corresponding or complementary web 34 projecting upward from the lower shell 32. At various places around one or both of the webs, a boss 35 or other spacing means is provided to engage the other web, as shown in FIG. 6. In vertical alignment with each of these bosses, a hole 36 extends through one of the shells to receive a machine screw or bolt 37. The head 38 of each of these screws nests in a counterbore 39. In the form illustrated, these clearance holes are in the lower shell 34, and the screws are threaded into aligned threaded holes 40 in the web 33, as indicated in FIG. 6. The bosses may of course be replaced by appropriate washers or spacers, any of these arrangements affording a satisfactory means of assuring a tight connection between the complementary shells while still providing a clearance opening to pass light or other rays received through the peripheral opening 9.

The upper shell is also provided with a depending cylindrical web 41 opposing a similar cylindrical web 42 extending upwardly from the inner surface of the lower shell 32. The spacing 43 between these two cylindrical structures, somewhat wider than the spaces 9 and 10, affords another aligned opening through which the rays 4 must pass en route to the reflecting members 11 and 12. These reflecting members, as well as the light sensitive instruments 13 and 14, may be mounted on a central post 43 anchored in appropriate recesses 44 and 45 in the upper and lower shells respectively.

If prismatic rings, such as rings 11a and 12a of FIG. 5, are employed instead of the first surface reflectors 11 and 12, the lower end of cylinder 41 and the upper end of cylinder 42 are appropriately counterbored to receive these contacting rings, which are thus mechanically supported and confined in their proper positions.

If the radiation source 3 is below the level being established by the structure 5, the greater amount of radiation will be received on the radiation sensing unit 13, and the signals from antenna 8 will vary accordingly. This information can be conveyed by the relative lengths of the signals or by their spacing, or by any other means well known in the art of conveying information by such transmissions. The mechanism and instrumentation by which this is done will not be described herein in greater detail, as the specific apparatus employed is immaterial to the present invention.

FIG. 5 shows an alternative arrangement for deflecting the incoming radiation. In this arrangement, two prismatic rings 11a and 12a replace the first-surface reflecting frustums illustrated in FIG. 2. A ray 4a will pass through the first surface of the prismatic rings 12a and upon reaching the far surface which is disposed at an angle of substantially 45° with respect to the first surface, the rays will be deflected downwardly. In a similar manner, rays passing through the first surface of the prismatic ring 11a will be directed upwardly toward the radiation sensing instrument 13a.

The mobile unit 1, in addition to comprising the radiation source 3, also comprises a radio receiver 27 tuned to the frequency of the transmitter 7 at the level-determining station 2. The operating personnel at the mobile station may themselves respond to the signals received from the level-determining station, or these signals may be fed to suitable apparatus that directly controls the grading or leveling equipment, or such other machinery as may be dependent for its proper operation upon the information conveyed by the signals. Such equipment is represented schematically by the unit 29, FIG. 4, which may be considered to be grading or leveling equipment, or a post hole driller in which the depth of the drilling is controlled in the same manner as the depth of the cut in the grading operation, as hereinafter explained.

The unit 29 may be equipped with suitable hydraulic or other controlling means whereby the holes may be drilled to the required depth with respect to the plane determined by the unit 5. The drilling apparatus may be arranged to stop automatically when this pre-determined depth has been reached. The specific automatic means for controlling the leveling, grading, drilling, or other apparatus forming a part of the mobile station 1 will not be described in detail, as the necessary control mechanism and the intervening apparatus that operates in response to the signals may all be constructed in accordance with principles already well known in the art and forming no part per se of this invention, as, for example the apparatus illustrated and described in U.S. Patent 2,916,836 issued to K. J. Stewart et al. or U.S. Patent 2,796,685 issued to Donald L. Bensinger.

It will readily be understood that many modifications may be made in the equipment hereinbefore described without departing from the broad spirit of my invention as succinctly set forth in the appended claims in which the various elements may be replaced by other elements performing their same functions, and to which other components may be added, and that various parts may be transposed or changed in position.

I claim:

1. In equipment for use in leveling and grading and the like: a mobile device whose elevation is to be determined with respect to a reference station, said device including apparatus for radiating electromagnetic waves and means for altering the elevation of said apparatus; and a reference station comprising a first reflecting member for directing in a generally upward direction such electromagnetic waves as may fall thereupon, a second reflecting member adjacent to the said first member for directing in a generally downward direction such electromagnetic waves as may reach said second member, a first radiation sensitive instrument disposed in the path of waves reflected from said first member, a second radiation sensitive instrument disposed in the path of waves reflected from said second member, a radiation shield surrounding said members, said shield having a channel therethrough to permit radiation to pass from said apparatus toward said members, means for leveling at least the portion of said station that embodies said channel, and means for transmitting information regarding the relative amount of radiation reaching said first and second instruments.

2. The combination of claim 1 in which the channel comprises an effectively continuous peripheral opening defining a plane passing substantially between said members.

3. The combination of claim 1 in which the shield is formed of complementary upper and lower spaced shells each having the general configuration of a dish, the convex sides of said shells facing each other.

4. The combination of claim 3 in which each shell has a depending web opposed to a corresponding web of the other shell whereby the two shells are joined together, at least one of said webs having radiation transmitting interruptions therein aligned with the mutually contiguous edges of the shells.

5. In equipment for use in leveling and grading and the like: a mobile device whose elevation is to be determined with respect to a reference station, said device including apparatus for radiating electromagnetic waves and means for altering the elevation of said apparatus; and a reference station comprising a first reflecting member for directing in a generally upward direction such electromagnetic waves as may fall thereupon, a second reflecting member adjacent to said first member for directing in a generally downward direction such electromagnetic waves as may reach said second member, a first radiation sensitive instrument disposed in the path of waves reflected from said first member, a second radiation sensitive instrument disposed in the path of waves reflected from said second member, a radiation shield surrounding said members, said shield comprising complementary shells each having its convex side facing the convex side of the other shell, means joining said shells in such spaced relationship that theer will be an annular recess between them, means for leveling said shield to facilitate the screening from said members of rays that do not pass through said annular recess in a level plane, and means for transmitting information regarding the relative amount of radiation reaching said first and second instruments.

6. In equipment for use in leveling and grading and the like: a mobile device whose elevation is to be determined with respect to a reference station, said device including apparatus for radiating electromagnetic waves and means for altering the elevation of said apparatus; and a reference station comprising a first reflecting member for directing in a generally upward direction such electromagnetic waves as may fall thereupon, a second reflecting member adjacent to said first member for directing in a generally downward direction such electromagnetic waves as may reach said second member, a first radiation sensitive instrument disposed in the path of waves reflected from said first member, a second radiation sensitive instrument disposed in the path of waves reflected from said second member, a radiation shield surrounding said members, said shield comprising complementary shells each having its convex side facing the convex side of the other shell, means joining said shells in such spaced relationship that there will be an annular recess between them, each of said shells having an integral web opposed to a corresponding web of the other shell whereby the two shells are joined together, said webs having radiation transmitting spaces between them lying in substantially the same plane as said annular recess and the mutually adjacent portions of said members to permit electromagnetic waves leaving said apparatus and passing through said recess to reach said members through said spaces when said recess and at least certain of said spaces are aligned with said apparatus, and means for transmitting information regarding the relative amount of radiation reaching said first and second instruments via said members.

7. In equipment for use in leveling and grading and the like: a mobile device whose elevation is to be determined with respect to a reference station, said device including apparatus for radiating electromagnetic waves and means for altering the elevation of said apparatus; and a reference station comprising a first reflecting member for directing in a generally upward direction such electromagnetic waves as may fall thereupon, a second reflecting member adjacent to said first member for directing in a generally downward direction such electromagnetic waves as may reach said second member, a first radiation sensitive instrument disposed in the path of waves reflected from said first member, a second radiation sensitive instrument disposed in the path of waves reflected from said second member, a radiation shield surrounding said members, said shield comprising complementary shells each having its convex side facing the convex side of the other shell, means joining said shells in such spaced relationship that there will be an annular recess between them, each of said shells having a depending web opposed to a corresponding web of the other shell whereby, the two shells are joined together, separating means between said webs to provide inter-web spaces lying in substantially the same plane as said annular recess and the mutually adjacent portions of said members to permit electromagnetic waves leaving said apparatus and passing through said recess to reach said members through said spaces when said recess and at least certain of said spaces are aligned with said apparatus, means for leveling said shield to facilitate the impingement on said members of waves traveling in a level plane, and means for transmitting information regarding the relative amount of radiation reaching said first and second instruments via said members.

8. In equipment for use in leveling and grading and the like: a mobile device whose elevation is to be determined with respect to a reference station, said device including apparatus for radiating electromagnetic waves and means for altering the elevation of said apparatus; and a reference station comprising a first reflecting member for directing in a generally upward direction such electromagnetic waves as may fall thereupon, a second reflecting member adjacent to said first member for directing in a generally downward direction such electromagnetic waves as may reach said second member, a first radiation sensitive instrument disposed in the path of waves reflected from said first member, a second radiation sensitive instrument disposed in the path of waves reflected from said second member, a radiation shield surrounding said members, said shield comprising complementary shells each having its convex side facing the convex side of the other shell, means joining said shells in such spaced relationship that there will be an annular recess between them, each of said shells having a depending web opposed to a corresponding web of the other shell whereby the two shells are joined together, spacing means integral with at least one of said webs to provide radiation-passing openings between them in substantially the same plane as said annular recess and the mutually adjacent portions of said members to permit electromagnetic waves leaving said apparatus and passing through said recess to reach said members through said openings when said recess and at least certain of said openings are aligned with said apparatus, means carried by at least one of said shells for supporting said members and said instruments, and means for transmitting information regarding the relative amount of radiation reaching said first and second instruments via said members.

9. In equipment for use in leveling and grading and the like: a mobile device whose elevation is to be determined with respect to a reference station, said device including apparatus for radiating electromagnetic waves and means for altering the elevation of said apparatus; and a reference station comprising a first reflecting member for directing in a generally upward direction such electromagnetic waves as may fall thereupon, a second reflecting member adjacent to said first member for directing in a generally downward direction such electromagnetic waves as may reach said second member, a first radiation sensitive instrument disposed in the path of waves reflected from said first member, a second radiation sensitive instrument disposed in the path of waves reflected from said second member, a radiation shield surrounding said members, said shield having a channel therethrough to permit radiation to pass from said apparatus toward said members, means whereby it may be readily determined whether said channel is level, means for leveling at least the portion of said station that embodies said channel, and means for transmitting information regarding the relative amount of radiation reaching said first and second instruments.

10. The combination of claim 9 wherein the means whereby it may be determined whether said channel is level comprises a container having a transparent convex cover sealed thereover, said container and cover filled with a relatively large amount of liquid and a relatively small amount of gas, the amount of said gas being only sufficient to create a bubble.

11. In equipment for use in leveling and grading and the like: a mobile device whose elevation is to be determined with respect to a reference station, said device including apparatus for radiating electromagnetic waves and means for altering the elevation of said apparatus; and a reference station comprising a first reflecting member for directing in a generally upward direction such electromagnetic waves as may fall thereupon, a second reflecting member adjacent to said first member for directing in a generally downward direction such electromagnetic waves as may reach said second member, a first radiation sensitive instrument disposed in the path of waves reflected from said first member, a second radiation sensitive instrument disposed in the path of waves reflected from said second member, a radiation shield surrounding said members, said shield having a channel therethrough to permit radiation to pass from said apparatus toward said members, means for leveling at least the portions of said station that embodies said channel, and radio transmitting means responsive to said instruments for transmitting signals indicative of the difference in the intensity of radiation from said members reaching said first and second instruments.

12. In equipment for use in leveling, grading and the like: a mobile device whose elevation is to be determined with respect to a reference station, said device including apparatus for radiating electromagnetic waves and means for altering the elevation of said apparatus; and a reference station comprisnig a first reflecting member for directing in a generally upward direction such electromagnetic waves as may fall thereupon, a second reflecting member adjacent to said first member for directing in a generally downward direction such electromagnetic waves as may reach said second member, a first radiation sensitive instrument disposed in the path of waves reflected from said first member, a second radiation sensitive instrument disposed in the path of waves reflected from said second member, a radiation shield surrounding said members, said shield having a channel therethrough to permit radiation to pass from said apparatus toward said members, means for leveling at least the portion of said station that embodies said channel, and radio transmitting means responsive to said instruments for transmitting signals indicative of the difference in the intensity of radiation from said members reaching said first and second instruments; and instrumentalities associated with said apparatus for receiving said signals and altering the elevation of said apparatus in accordance with the difference in the intensity of radiation reaching said first and second instruments as indicated by said signals.

13. In equipment for use in leveling, grading and the like: a mobile device whose elevation is to be determined with respect to a reference station, said device including apparatus for radiating electromagnetic waves and means for altering the elevation of said apparatus; and a reference station comprising a first reflecting member for directing in a generally upward direction such electromagnetic waves as may fall thereupon, a second reflecting member adjacent to said first member for directing in a generally downward direction such electromagnetic waves as may reach said second member, a first radiation sensitive instrument disposed in the path of waves reflected from said first member, a second radiation sensitive instrument disposed in the path of waves reflected from said second member, a radiation shield surrounding said members, said shield having a channel therethrough to permit radiation to pass from said apparatus toward said members, means for leveling at least the portion of said station that embodies said channel, and radio transmitting means responsive to said instruments for transmitting signals indicative of the difference in the intensity of radiation from said members reaching said first and second instruments; and instrumentalities associated with said apparatus for receiving said signals and making the information conveyed by the signals available to operating personnel.

References Cited by the Examiner

UNITED STATES PATENTS

| | | | |
|---|---|---|---|
| 1,922,791 | 8/1933 | Bumpus. | |
| 1,942,604 | 1/1934 | Kennedy | 250—203 X |
| 2,703,505 | 3/1955 | Senn | 88—14 |
| 2,802,207 | 8/1957 | Sommers et al. | 88—14 |
| 2,952,779 | 9/1960 | Talley | 88—14 X |
| 3,011,384 | 12/1961 | Biber | 88—14 X |
| 3,012,469 | 12/1961 | Clayborne | 88—14 |

RALPH G. NILSON, *Primary Examiner.*

WALTER STOLWEIN, *Examiner.*